(12) United States Patent
Nefian et al.

(10) Patent No.: US 7,274,800 B2
(45) Date of Patent: Sep. 25, 2007

(54) DYNAMIC GESTURE RECOGNITION FROM STEREO SEQUENCES

(75) Inventors: Ara Victor Nefian, Santa Clara, CA (US); Radek Grzesczuk, Menlo Park, CA (US); Victor Eruhimov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 10/349,872

(22) Filed: Jan. 23, 2003

(65) Prior Publication Data
US 2003/0113018 A1 Jun. 19, 2003

Related U.S. Application Data

(60) Provisional application No. 60/371,178, filed on Apr. 9, 2002.

(51) Int. Cl.
*G06K 9/00* (2006.01)

(52) U.S. Cl. ............... 382/103; 382/154; 715/863; 348/169

(58) Field of Classification Search ............ 382/100, 382/103, 107, 154; 715/863; 348/169, 208.1
See application file for complete search history.

(56) References Cited

U.S. PATENT DOCUMENTS

| | | | |
|---|---|---|---|
| 5,454,043 A | 9/1995 | Freeman | |
| 5,596,362 A | 1/1997 | Zhou | |
| 5,710,590 A | 1/1998 | Ichige et al. | |
| 5,754,695 A | 5/1998 | Kuo et al. | |
| 5,850,470 A | 12/1998 | Kung et al. | |
| 5,887,069 A | 3/1999 | Sakou et al. | |
| 6,024,852 A | 2/2000 | Tamura et al. | |
| 6,072,494 A | 6/2000 | Nguyen | |

(Continued)

FOREIGN PATENT DOCUMENTS

RU 2112273 8/1995

(Continued)

OTHER PUBLICATIONS

Rakesh Dugad et al. Tutorial on Hidden Markov Models. Technical Report No. : SPANN-96.1, May 1996, pp. 1-16.

(Continued)

*Primary Examiner*—Vikkram Bali
*Assistant Examiner*—Anand Bhatnagar
(74) *Attorney, Agent, or Firm*—Blakely, Sokoloff, Taylor & Zafman LLP

(57) ABSTRACT

According to an embodiment, an apparatus and method are disclosed for dynamic gesture recognition from stereo sequences. In an embodiment, a stereo sequence of images of a subject is obtained and a depth disparity map is generated from the stereo sequence. The system is initiated automatically based upon a statistical model of the upper body of the subject. The upper body of the subject is modeled as three planes, representing the torso and arms of the subject, and three Gaussian components, representing the head and hands of the subject. The system tracks the upper body of the subject using the statistical upper body model and extracts three-dimensional features of the gestures performed. The system recognizes the gestures using recognition units, which, under a particular embodiment, utilizes hidden Markov models for the three-dimensional gestures.

32 Claims, 11 Drawing Sheets

U.S. PATENT DOCUMENTS

| | | | |
|---|---|---|---|
| 6,075,895 | A | 6/2000 | Qiao et al. |
| 6,108,005 | A | 8/2000 | Starks et al. |
| 6,128,003 | A | 10/2000 | Smith et al. |
| 6,154,559 | A * | 11/2000 | Beardsley ................... 382/103 |
| 6,184,926 | B1 | 2/2001 | Khosravi et al. |
| 6,185,529 | B1 | 2/2001 | Chen et al. |
| 6,191,773 | B1 | 2/2001 | Maruno et al. |
| 6,204,852 | B1 | 3/2001 | Kumar et al. |
| 6,212,510 | B1 | 4/2001 | Brand |
| 6,215,890 | B1 * | 4/2001 | Matsuo et al. .............. 382/103 |
| 6,219,639 | B1 | 4/2001 | Bakis et al. |
| 6,222,465 | B1 * | 4/2001 | Kumar et al. ................. 341/20 |
| 6,304,674 | B1 * | 10/2001 | Cass et al. .................. 382/224 |
| 6,335,977 | B1 * | 1/2002 | Kage .......................... 382/107 |
| 6,385,331 | B2 * | 5/2002 | Harakawa et al. ......... 382/106 |
| 6,594,629 | B1 | 7/2003 | Basu et al. |
| 6,609,093 | B1 | 8/2003 | Gopinath et al. |
| 6,624,833 | B1 * | 9/2003 | Kumar et al. ............... 715/863 |
| 6,633,844 | B1 | 10/2003 | Verma et al. |
| 6,678,415 | B1 | 1/2004 | Popat et al. |
| 6,751,354 | B2 | 6/2004 | Foote et al. |
| 6,816,836 | B2 | 11/2004 | Basu et al. |
| 6,952,687 | B2 | 10/2005 | Andersen et al. |
| 6,964,123 | B2 | 11/2005 | Vicale |
| 2002/0036617 | A1 * | 3/2002 | Pryor ......................... 345/156 |
| 2002/0064382 | A1 * | 5/2002 | Hildreth et al. ............. 396/100 |
| 2002/0093666 | A1 * | 7/2002 | Foote et al. ................. 356/621 |
| 2002/0102010 | A1 * | 8/2002 | Liu et al. ..................... 382/107 |
| 2002/0135618 | A1 | 9/2002 | Maes et al. |
| 2002/0140718 | A1 | 10/2002 | Yan et al. |
| 2002/0161582 | A1 | 10/2002 | Basson et al. |
| 2003/0123754 | A1 | 7/2003 | Toyama |
| 2003/0144844 | A1 | 7/2003 | Colmenarez et al. |
| 2003/0154084 | A1 | 8/2003 | Li et al. |
| 2003/0171932 | A1 | 9/2003 | Juang et al. |
| 2003/0190076 | A1 | 10/2003 | Delean |
| 2006/0210112 | A1 * | 9/2006 | Cohen et al. ............... 382/103 |

FOREIGN PATENT DOCUMENTS

| | | |
|---|---|---|
| RU | 2093890 | 10/1997 |
| RU | 2093890 C1 | 10/1997 |
| RU | 2112273 C1 | 5/1998 |
| WO | WO 00/36845 | 6/2000 |
| WO | PCT/RU 01/00296 | 7/2001 |

OTHER PUBLICATIONS

Brand: Coupled Hidden Markov Models for Modeling Interacting Processes; Learning and Common Sense Technical Report 405, Jun. 3, 1997, MIT Media Lab Perceptual Computing, USA, pp. 1-28.

Chan: HHH-Based Audio-Visual Speech Recognition Integrating Geometric and Appearance-Based Visual Features, IEEE 2001.

Dugad: Tutorial on Hidden Markov Models; Technical Report No.: SPANN-96, May 1996, pp. 1-16.

Dupont et al: Audio-Visual Speech Modeling for Continuous Speech Recognition, Sep. 2000, IEEE Transactions on Multimedia, vol.2, No. 3, pp. 141-151.

Fu, et al: Audio-Visual Speaker Identification Using Coupled Hidden Markov Models; 2003 Int'l Conference on Image Processing (ICIP), Sep. 14-17, 2003; vol. 2, pp. 29-32.

Hennecke, et al: Automatic Speech Recognition System Using Acoustic and Visual Signals, IEEE, 1996.

Kennedy, et al: Identification of Coupled Markov Chain Model with Application; Proceedings of the 31st IEEE Conference on Decision and Control, Dec. 16-18, 1992; vol. 4, pp. 3529-3534.

Kristjansson, et al: Event-Coupled Hidden Markov Models; 2000 IEEE Int'l Conference on Multimedia and Expo, Jul. 30-Aug. 2, 2000; vol. 1; pp. 385-388.

Liang, et al: Speaker Independent Audio-Visual Continuous Speech Recognition; Aug. 2002; Multimedia and Expo, vol. 2, pp. 25-28; IEEE.

Logan et al: Factorial Hidden Markov Models for Speech Recognition: Preliminary Experiments; Cambridge Research Laboratory; Technical report Series; CRL 97/7; Sep. 1997.

Nefian et al: An Embedded HMM-Based Approach for Face Detection and Recognition; Proceedings of the IEEE Int'l Conference on Acousincs, Speech and Signal Processing, Mar. 15-19, 1999; IEEE, Mar. 15, 1999, pp. 3553-3556, USA.

Nefian, et al: A Coupled HMM for Audio-Visual Speech Recognition; Proceeding IEEE Int'l Conference on Acousitics, Speech, and Signal Processing, vol. 3 of 4, May 13-17, 2002, pp. 2013-2016.

Nefian: Embedded Bayesian Networks for Face Recognition; IEEE In'tl Conference on Multimedia and Expo; IEEE vol. 2, Aug. 26, 2002, pp. 133-136.

Pavlovic: Dynamic Bayesian Networks for Information Fusion with Applications to Human-Computer Interfaces; Thesis, University of Urbana-Champaign, 1999, pp. iii-ix and 63-81.

Pavlovic: Multimodal Tracking and Classification of Audio-Visual Features; 1998 Int'l Conference on Image Processing, ICIP Proceedings; Oct. 4-7, 1998, vol. 1; pp. 343-347.

Wikipedia, definition of Hidden Markov Model, 3 pages.

Potamianos et al: An Image Transform Approach for HMM Based Automatic Lipreading, Proc. Int. conf. Image Processing, 1998.

Potamianos et al: Linear Discriminant Analysis for Speechreading; IEEE Workshop on Multimedia Processing, Dec. 1998.

Ramesh, et al: Automatic Selection of Tuning Parameters for Feature Extraction Sequences; Proceedings IEEE Computer Society Conference on Computer vision and Pattern Recognition; Jun. 21-23, 1994, pp. 672-677.

Rezek, et al: Coupled Hidden Markov Models for Biosignal Interaction; Advances in Medical Signal and Information Processing, Sep. 4-6, 2000; pp. 54-59.

Rezek, et al: Learning Interaction Dynamics with Coupled Hidden Markov Models; IEEE Proceedings—Science, Measurement and Technology, Nov. 2000; vol. 147, Issue 6; pp. 345-350.

Wikipedia, definition of Viterbi Algorithm, 5 pages.

U.S. Appl. No. 10/142,468, filed May 9, 2002, Office Action dated Mar. 1, 2006.

U.S. Appl. No. 10/142,468, filed May 9, 2002, Office Action dated Aug. 2, 2005.

U.S. Appl. No. 10/143,459, filed May 9, 2002, Office Action dated May 23, 2006.

U.S. Appl. No. 10/269,333, filed Oct. 11, 2002, Final Office Action dated May 16, 2006.

U.S. Appl. No. 10/269,333, filed Oct. 11, 2002, Office Action dated Jan. 20, 2006.

U.S. Appl. No. 10/269,381, filed Jan. 6, 2003, Final Office Action dated Jul. 11, 2006.

U.S. Appl. No. 10/269,381, filed Jan. 6, 2003, Office Action dated OA Mar. 3, 2006.

PCT/US 03/31454 Int'l Search Report dated Mar. 1, 2004.

U.S. Appl. No. 10/326,368, Office Action dated Jul. 25, 2006.

Luettin et al.: Asynchronous Stream Modelling for Large Vocabulary Audio-Visual Speech Recognition, Proceedings of the 2001 IEEE Int'l Conference of Acoustics, Speech and Signal Processing (ICASSP'01), May 7-11, 2001, pp. 169-172.

Gordan: A Temporal Network for Support Vector Machine Classifiers for the Recognition of Visual Speech, Methods and Applications of Artificial Intelligence: Proceedings of the 2nd hellenic Conference on AI (SETN 2002), Thessaloniki, Greece, Apr. 11-12, 2002, pp. 355-365.

Ming-Husan Yang et al.: Detecting Faces in Images: A Survey; IEEE trans Pattern Analysis and Machine Intelligence, vol. 24, No. 1, Jan. 2002, pp. 34-58.

Yongmin Li et al.: Multi-view Face Detection Using Support Vector Machines and Eigenspace Modelling, Proceedings on the Int'l Conference on Knowledge-based Intelligent Engineering Systems and.

Batra: Modeling and Efficient Optimization for Object-Based Scalability and Some Related Problems, IEEE Transactions onImage processing, vol. 9, No. 10, Oct. 10, 2000, pp. 1677-1692.

Li, Yongmin, et al., "Multi-View Face Detection Using Support Vector Machines and Eigenspace Modelling", *Proceedings on the*

*International Conference on Knowledge-based intelligent Engineering Systems and Allied Technologies* Brighten UK, Sep. 2000, 241-244.

Yang, Ming H., et al., "Detecting Faces in Images", *A Survey: IEEE Trans Pattern Analysis and Machine Intelligence*, vol. 24, No. 1, Jan. 2002, 34-58.

Wikipedia Aug. 29, 2006—Linear Discriminant Analysis—http://en.wikipedia.org/wiki/Linear_discriminant_analysis.

Neti et al—Large Vocabulary Audio Visual Speech Recognition: A Summary of the Johns Hopkins Summer 2000 Workshop—pp. 619-624.

U.S. Appl. No. 10/143,459, Filed May 9, 2002—Final Office Action Mailed Oct. 31, 2006.

* cited by examiner

Conventional Gesture Recognition

Five States
Left-To-Right HMM

Gesture Recognition Equipment Embodiment

Initialization - Segmentation of Image

Image of Subject With Background

Image of Subject With Background Removed

Torso Segmentation

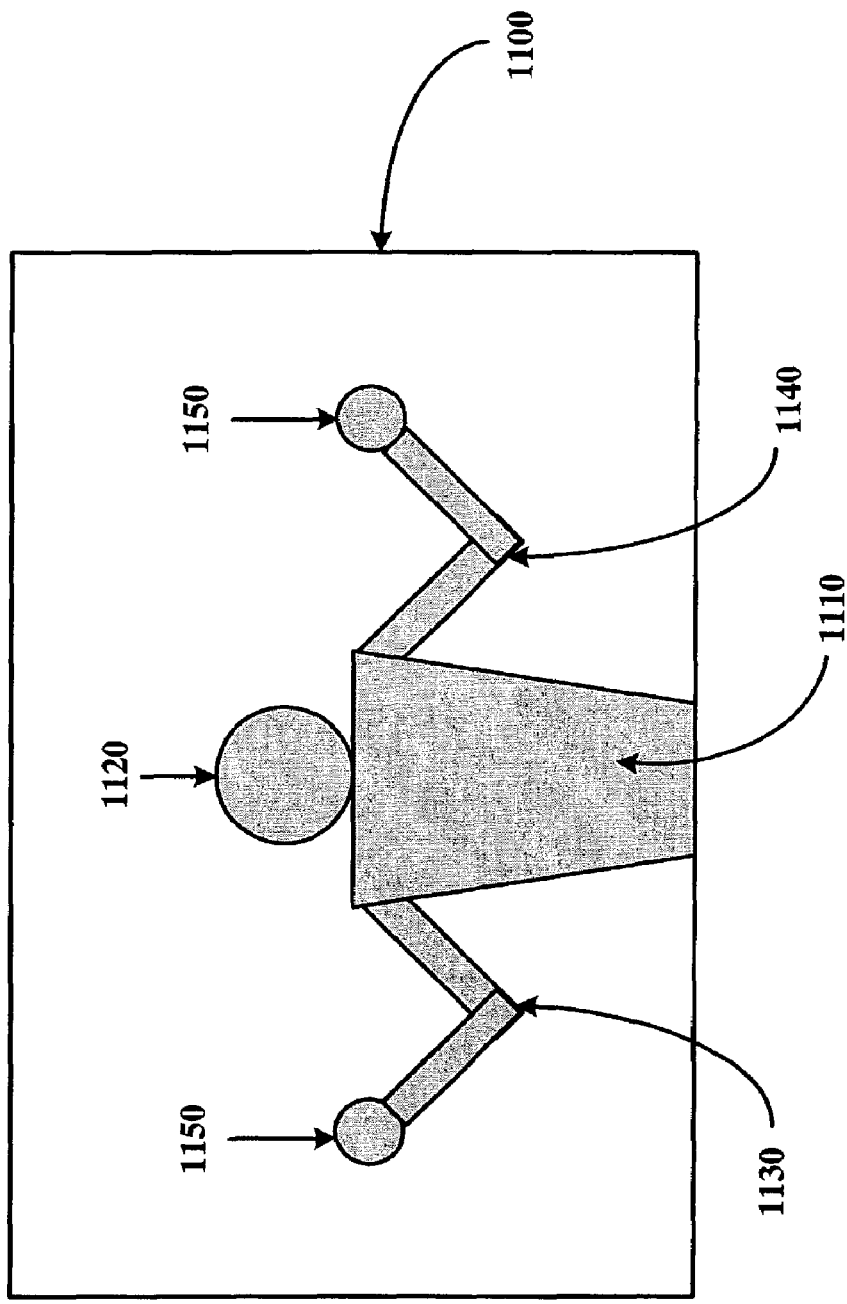

DYNAMIC GESTURE RECOGNITION FROM STEREO SEQUENCES

RELATED APPLICATIONS

This application is related to and claims priority from U.S. provisional application 60/371,178, filed Apr. 9, 2002, entitled "Dynamic Gesture Recognition from Stereo Sequences"; and PCT application RU01/00296, international filing date Jul. 18, 2001, entitled "Dynamic Gesture Recognition from Stereo Sequences".

FIELD OF THE INVENTION

This invention relates to system interfaces in general, and more specifically to dynamic gesture recognition from stereo sequences.

BACKGROUND OF THE INVENTION

The field of gesture recognition for computer systems has been developing in recent years. In general, a gesture recognition system will recognize physical gestures made by an individual and respond according to an interpretation of the gestures. Gesture recognition may be used in a computer interface, for interpreting sign language, in industrial control, in entertainment applications, or for numerous other purposes. The challenge in gesture recognition systems is to provide a simple, easy to use system that is also highly accurate in interpretation of gestures.

In conventional gesture recognition systems, the process may proceed as shown in FIG. 1. A video sequence is captured, process block 100, from a video source, such as a conventional video camera. The process of background removal, process block 110, attempts to eliminate the portion of an image from the video sequence that contains the background, which is any portion of the image that doesn't include the subject performing the gestures that are being interpreted. If the video frame is the first frame of the video sequence, process block 120, the process continues to the manual initialization stage, process block 130. In manual initialization, process block 120, the position and orientation of the visible parts (generally the head, hands, arms, and torso) of the subject are determined. Conventional systems generally utilize manual initialization processes in which, for example, the process may initialize by requiring the subject to begin by holding his or her arms and hands in a predetermined position. In other systems the system may initialize on the subject by the process of the subject placing colored gloves on his or her hands or colored markers on the subjects' hands and head.

If the video frame is not the first frame in the sequence, process block 120, the conventional system then proceeds with the process of tracking the upper body of the subject, process block 140. Upon initializing the system or tracking the upper body of the subject to its new position, the process of feature extraction, process block 150, is the process of determining the features that best describe hand gestures and best discriminate among various gestures. Often the features used in dynamic hand gesture recognition are derived from the position of the hands in the image plane or from the relative position of the hands to the head of the subject. In the conventional system, the input is an image in two-dimensional form and the upper body may be characterized as six Gaussian "blobs", which comprise the head, trunk, two arms and two hands of the subject. The conventional system then continues with operation of the recognition units 160, which are intended to identify the gesture made by the subject. The recognition units may include hidden Markov models (HMM).

A conventional gesture recognition system is limited in a number of ways. The use of two-dimensional images may provide insufficient depth of field information to properly detect upper body positions, which may lead to misinterpretation of gestures. The need to initialize a gesture recognition system with specified gestures or the use of special devices creates additional difficulty in using a system and may discourage users from attempting to access a system that incorporates gesture recognition.

BRIEF DESCRIPTION OF THE DRAWINGS

The appended claims set forth the features of the invention with particularity. The invention, together with its advantages, may be best understood from the following detailed descriptions taken in conjunction with the accompanying drawings, of which:

FIG. 11 illustrates the process of hands segmentation.

DETAILED DESCRIPTION

A method and apparatus are described for dynamic gesture recognition from stereo sequences.

In the following description, for the purposes of explanation, numerous specific details are set forth in order to provide a thorough understanding of the present invention. However, it will be apparent to one skilled in the art that the present invention may be practiced without some of these specific details. In other instances, well-known structures and devices are shown in block diagram form.

The present invention includes various processes, which will be described below. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Figure 1:
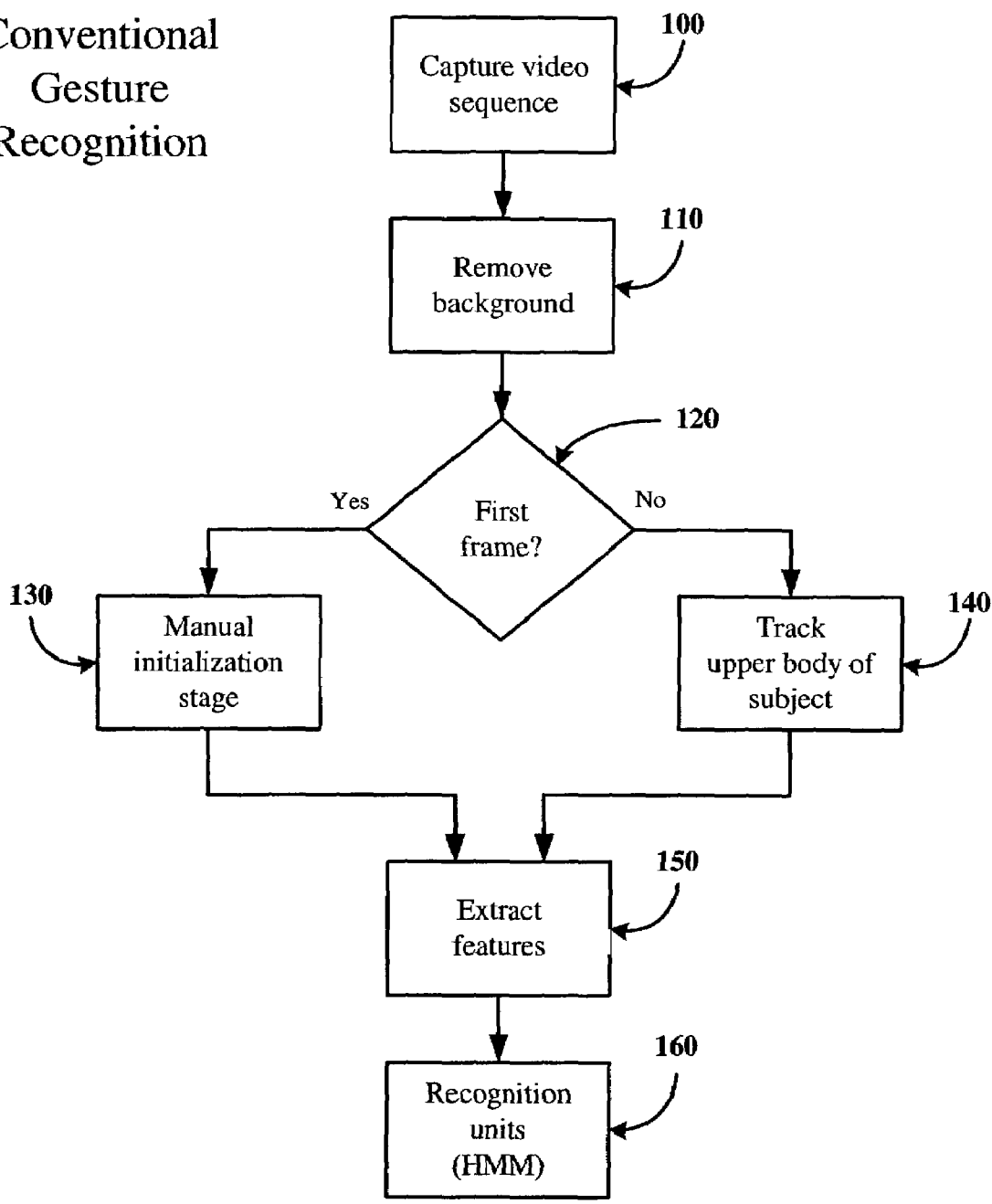
FIG. 1 is a flow diagram illustrating a conventional gesture recognition system.
Figure 2:
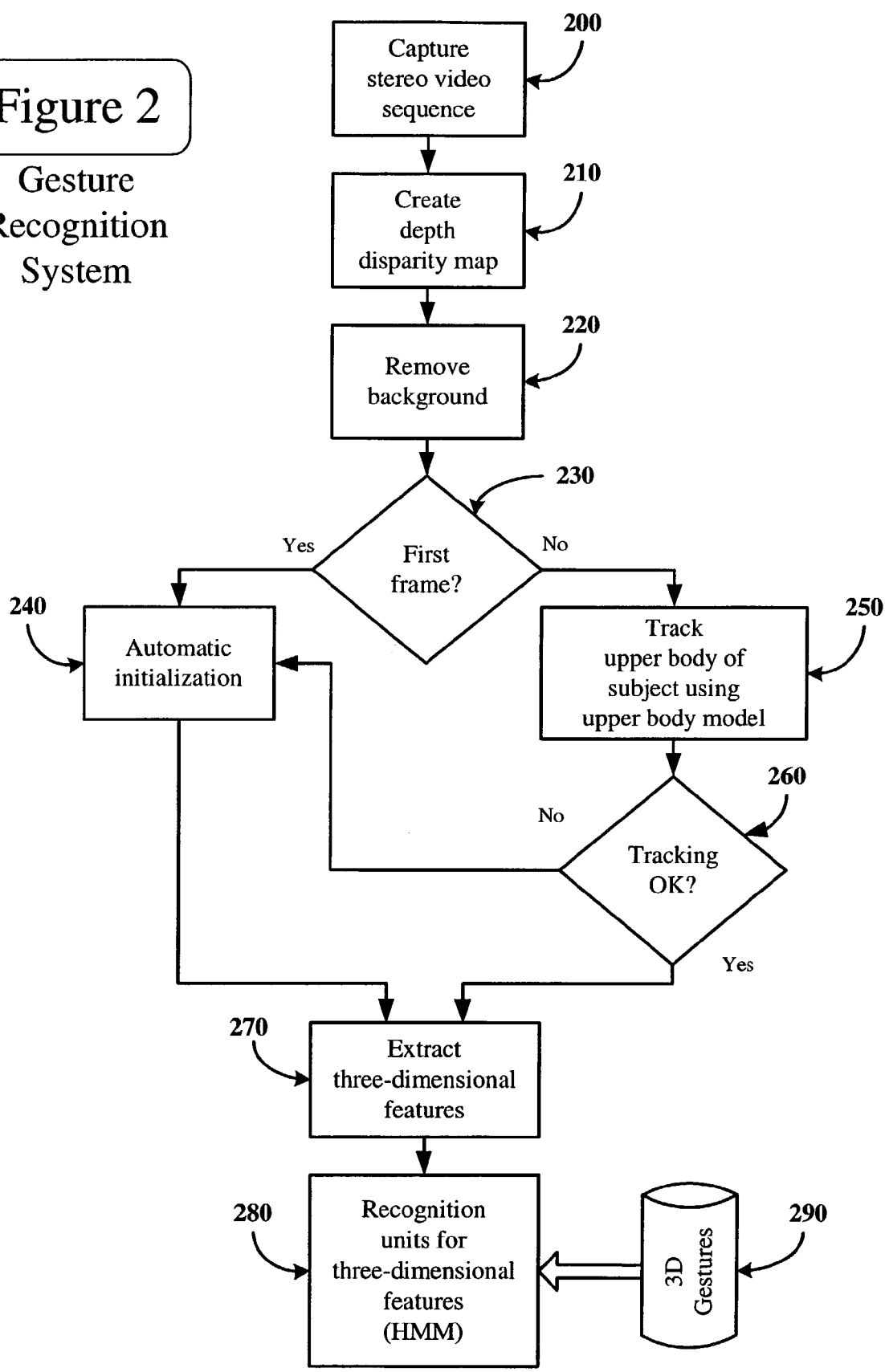
FIG. 2 is a flow diagram illustrating an embodiment of a dynamic gesture recognition system.

FIG. 2 contains a flow diagram illustrating an embodiment of a dynamic gesture recognition system. In this embodiment, images are obtained through the capture of stereo video sequences, process block 200. The stereo video sequences may be captured using a stereo camera or using multiple cameras. From the stereo images, the system then includes the creation of a depth disparity map, process block 210, from which the depth of field of the images may be determined. The system then removes the background 220, which, according to one embodiment, may be accomplished through removal of any portions of an image that are too far from the imaging device to be part of the subject.

If the video frame is the first frame in the sequence, process block 230, the embodiment provides for automatic initialization, process block 240, which allows for the initialization of the system based upon matching the upper body of the subject to a statistical model of the upper body of an individual. If the video frame is not the first frame in the sequence, process block 230, the embodiment provides for the tracking of the subject's upper body using the upper body model, process block 250. If the tracking of the subject is not sufficient, process block 260, the process returns to automatic initialization, process block 240, to re-initialize the system. The embodiment thus describes a decision criterion for the failure of the tracking system.

Upon initializing the system or tracking the upper body of the subject to its new position, three-dimensional feature extraction, process block 270 is utilized, rather than extraction of features in two dimensions as in conventional systems. This is followed by recognition units for the three-dimensional features, process block 280, to identify the dynamic gesture. In a particular embodiment, recognition units 280 utilize hidden Markov models. However, unlike conventional systems, the hidden Markov models describe the trajectories of the hands in three dimensions. In one embodiment, a gesture made by a subject is recognized and interpreted by comparing the dynamic gesture to a database of known three-dimensional gestures, process block 290.

Figure 3:
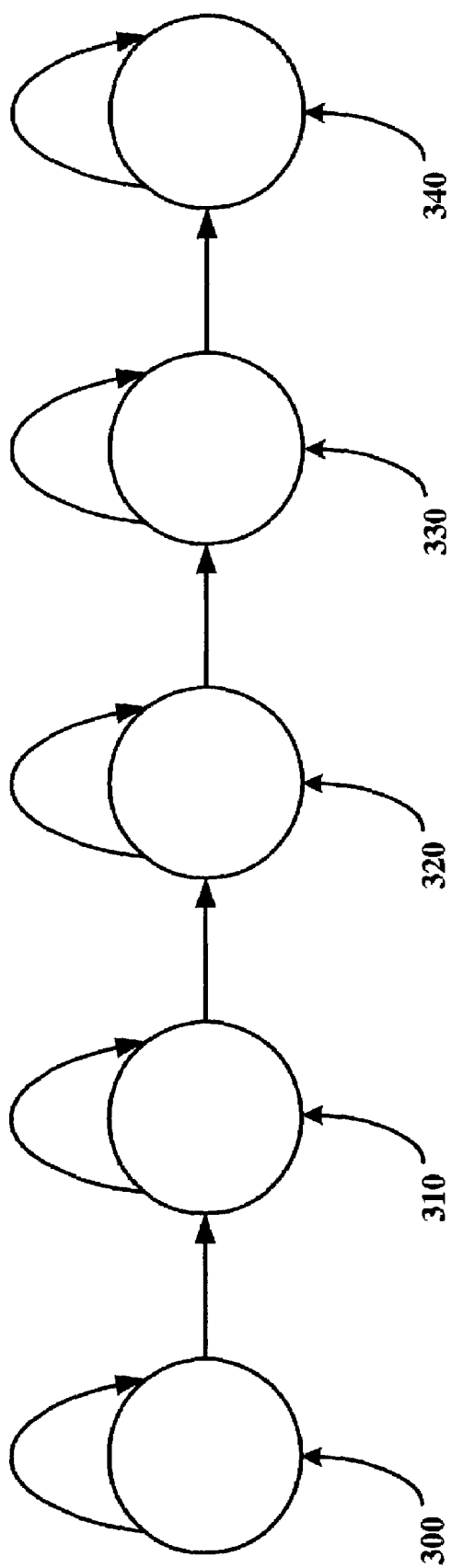
FIG. 3 is a flow diagram illustrating the hidden Markov model used in a particular embodiment.

Hidden Markov models are well-known processing systems and thus will not be explained in detail. A hidden Markov model is a finite set of states, with each of the states having a probability distribution. Transitions between the states in the model are governed by a set of probabilities that are referred to as transition probabilities. While in a particular state of the model, an observation can be made, but the actual state is not observable. For this reason, the states are referred to as hidden. In a particular embodiment, a continuous five states, left-to-right hidden Markov model is utilized. In this embodiment, no skip states are allowed and each state is modeled by a mixture of three Gaussian density functions. The model is illustrated in FIG. 3, with the five states of the model being states 300, 310, 320, 330, and 340.

Figure 4:
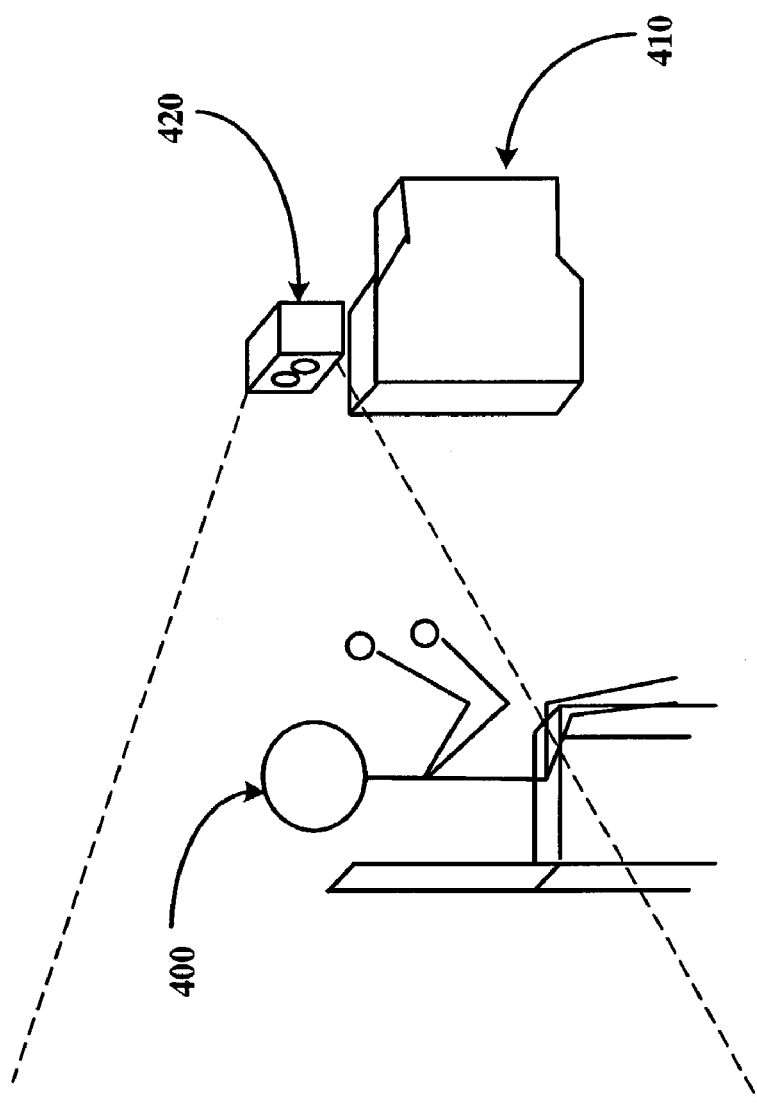
FIG. 4 is an illustration of an arrangement of a dynamic gesture recognition system.

An equipment arrangement for a particular embodiment is shown in FIG. 4. In this embodiment, the subject 400 is seated in front of a computer or terminal 410. Placed on the top of the terminal is an imaging device 420. Imaging device 420 is shown in FIG. 4 as a stereo camera, but multiple cameras could be used in other embodiments.

In an embodiment, a statistical framework for upper body segmentation is used. An embodiment includes tracking of the upper body from stereo images, and uses the trajectories of the hands of the subject as observations for HMM-based three-dimensional gesture recognition. Dense disparity maps are used in the system, generated from the stereo images. The system provides accurate gesture recognition when encountering varying illumination conditions, partial occlusions, and self-occlusions. Unlike conventional gesture recognitions systems that require a user guided initialization, the approach to upper body segmentation under an embodiment make use of a minimal set of assumptions regarding the relative position of the subject to the image capturing device for initialization. Following the initialization, the model parameters are tracked over consecutive frames and the new values of the parameters are updated, or re-initialized, using an expectation maximization algorithm. The three-dimensional positions of the hands of the subject are used as observation vectors for the gesture recognition system.

According to an embodiment, the video sequence is a novel stereo image of the subject. According to one embodiment, a depth disparity map is generated from the stereo image. According to another embodiment, the stereo image is obtained from a stereo camera that generates the needed depth information without the need for additional depth disparity map generation. The use of such a stereo camera allows the operation of the system without the need for the large number of computations that are required to generate a depth disparity map.

Additional details regarding of the gesture recognition system are provided as follows:

Image Model and Upper Body Model—The statistical model for the upper body consists of a set of three planar components, describing the torso and the arms of the subject, and a set of three Gaussian blob components, representing the head and hands of the subject. For the purposes of this description, the parameters of each planar component (the mth planar component) are referred to as $\pi_m$ and the parameters of each of the Gaussian components (the nth Gaussian component) are referred to as $\beta_n$. The set of planar and Gaussian components that make up the states of the upper body of the subject then are:

$$\Omega = \{\pi_m, \beta_n\} \text{ with } m=1,2,3 \text{ and } n=1,2,3 \quad [1]$$

In an image of the subject, an observation vector $O_{i,j}$ is the pixel in the ith row and the jth column in the image, and consists of the three dimensional position of the pixel as obtained from the disparity maps $$O_{i,j}^d = \{x, y, z\}_{i,j}$$

and of the color of the pixel in the image space $O_{i,j}^c$. $O_{i,j}$ is obtained by concatenating color $O_{i,j}^c$ and depth disparity $O_{i,j}^d$.

If it is assumed that all of the observations vectors are independent, then the probability of a particular observation sequence $Q=[O_{i,j}|\text{all } i,j]$ given the image model is:

$$P(Q|I) = \prod_{i,j} \{P(O_{i,j}|\Omega) + P(O_{i,j}|\text{backgnd})\} \quad [2]$$

where $P(O_{i,j}|\Omega)$ is the probability of the observation vector given the upper body model and $P(O_{i,j}|\text{backgnd})$ is the probability of the observation vector given the background that is behind the subject. In one embodiment, the probability of the observation vector given the background is obtained from the Gaussian distribution at each pixel in the image obtained from a sequence of clean background scenes, without a subject. In another embodiment, the computational complexity of the system is reduced by modeling only the observation vectors that are not assigned to the background. In a three-dimensional system in which the depth of field may be determined, any image that is not close enough to the camera to be a part of the subject is then part of the background. As the subject is in the foreground, the probability of a sequence of foreground observations $Q_F$ given the upper body model is then defined as:

$$P(\underline{O}_F \mid \Omega) = \prod_{i,j \in F} \left\{ \sum_{m=1}^{3} P_{0,\pi_m}(O_{i,j}) P(O_{i,j} \mid \pi_m) + \sum_{n=1}^{3} P_{0,\beta_n}(O_{i,j}) P(O_{i,j} \mid \beta_n) + u_{i,j} \right\} \quad [3]$$

where $u_{i,j}$ is a uniform distribution that models the image noise and $P_{0,\pi_m}$ and $P_{0,\beta_n}$ are the a priori probabilities of the planar and Gaussian states of the upper body model. In an embodiment, the initial values of the a priori probabilities are chosen uniformly for all of the upper body components.

After the initialization of the upper body model, the values of the a priori probabilities are estimated from the corresponding parameters of the model states. Probabilities $P(O_{i,j}|\pi_m)$ and $P(O_{i,j}|\beta_n)$ are the probabilities of the observation vectors $O_{i,j}$ given the planar $\pi_m$ and Gaussian $\beta_n$ components. Given these probabilities, then the probability density function (pdf) for a Gaussian component of an image is:

$$P(O_{i,j} \mid \beta) = \frac{1}{(2\pi)^{D/2} |C|^{1/2}} \exp\left[-\frac{1}{2}(O_{i,j} - \underline{\mu})^T C^{-1}(O_{i,j} - \underline{\mu})\right] \quad [4]$$

where $\mu$ is the mean vector and C is the covariance of the Gaussian probability density function. For the purposes of an embodiment of the gesture recognition system, the parameters of the Gaussian components are designated as $\beta=(\mu,C)$. Because the color distribution and the three-dimensional position can be considered to be independent random variables, the probability of the observation vectors $O_{i,j}$ given the planar components (arms and torso) can be decomposed as $$P(O_{i,j}|\pi) = P(O_{i,j}^d|\pi) P(O_{ij}^c|\pi) \quad [5]$$

In equation [5], $P(O_{ij}^c|\pi)$ can be a Gaussian probability density function or can be a mixture of Gaussian probability density functions describing the color distribution of the pixels assigned to the plane. According to one embodiment, for simplification, a uniform distribution over the entire range of hue values (for example 0, ..., 255 for 256 colors) is used. The probability of the observation vectors $O_{i,j}^d$ given the planar component $\pi$ can be defined by the following planar probability density function:

$$P(O_{i,j}^d \mid \pi) = \frac{1}{\sqrt{2\pi\sigma_z^2}} \exp\left(-\frac{(z_{ij} - (ax_{ij} + by_{ij} + c))^2}{2\sigma^2}\right) \quad [6]$$

From equation [6], it then can be discerned that the planar probability density function describes a Gaussian distribution with mean $\mu=ax_{ij}+by_{ij}+c$ and with variance $\sigma_z^2$. For the purposes of this description, the parameters of the planar components are defined as $\pi_m=(a, b, c, \sigma_z^2)$ for m=1, 2, 3.

Upper Body Segmentation—Model Initialization—The optimal set of parameters for the upper body model are obtained through an estimation maximization (EM) algorithm by maximizing $P(\underline{O}|\Omega)$ with respect to the model parameters. This corresponds to the estimation maximization algorithm applied to the upper body model. Since the estimation maximization is in essence a local optimization algorithm, its convergence to the global solution depends heavily on the initial estimate of the model parameters. To ensure the correct convergence of the estimation maximization algorithm, the segmentation algorithm proceeds in two processes. In the first process, the system initializes the parameters of each class and determines the visibility of each component in the image. In the second process, all of the model parameters are simultaneously re-estimated, thereby producing a tighter fit to the data.

The initialization process is in essence a sequence of two-class classification problems that are repeated for each component of the model. In each of these problems, the data is assigned to either one component of the upper body or to a "residual" class of the remaining unassigned data. The data assigned to the residual class in the first classification problem becomes the input to the second classification process, where it either is re-assigned to the next body component or becomes a part of the new residual class. This process is repeated until all of the data is classified or until all of the upper body components are initialized. The remaining residual class is modeled by a uniform distribution. Note that that the embodiment described herein utilizes a particular order of segmentation, but those in the field will recognize that other segmentation orders are possible and embodiments are not limited to the description provided herein.

Figure 5:
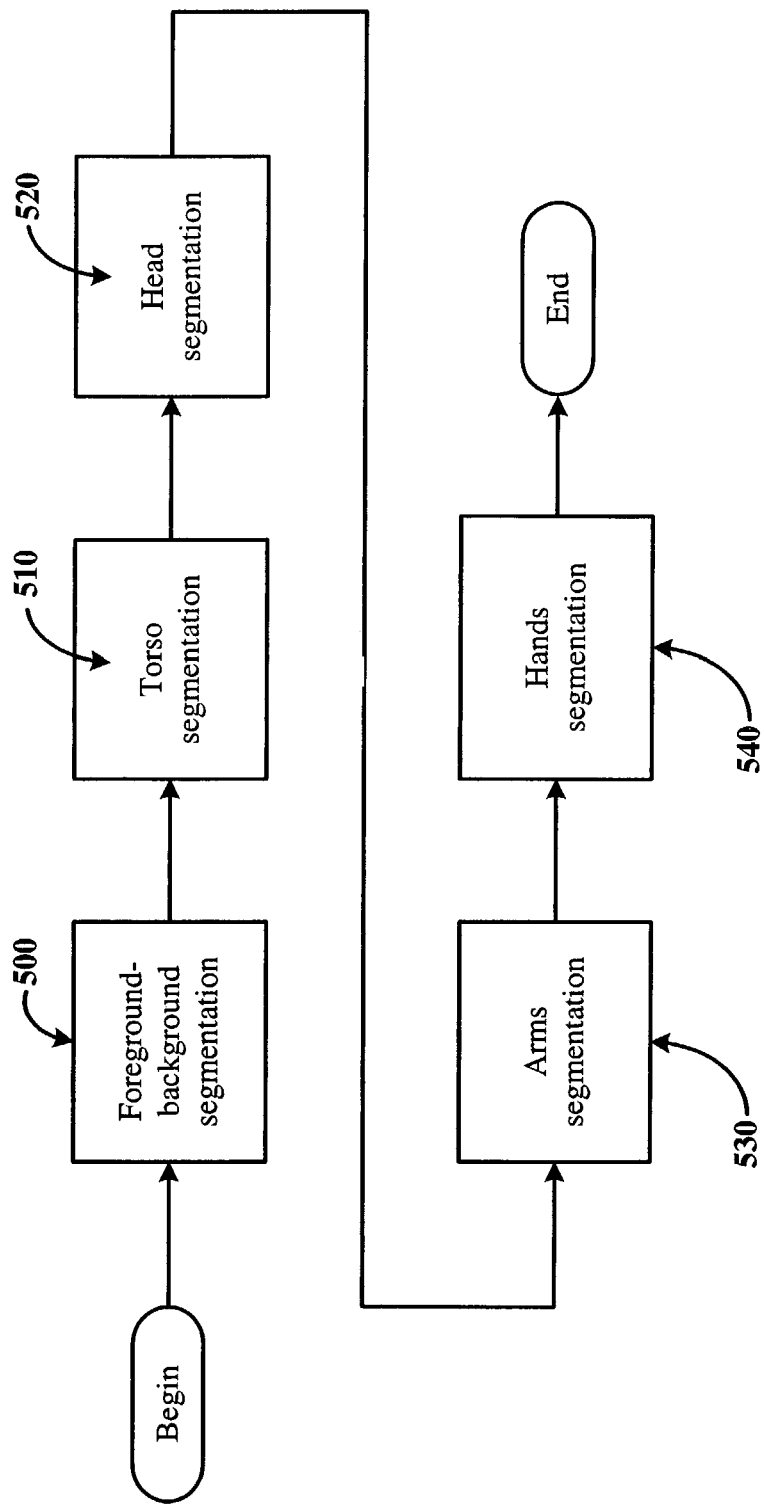
FIG. 5 is a flow diagram illustrating the segmentation of the image during initialization.

A block diagram of an initialization process is shown in FIG. 5. In the foreground-background segmentation process, process block 500, the background of an image of a subject is eliminated. In one embodiment, all pixels in the image that have a depth indicating a distance that is greater than a specified distance from the camera or other imaging device are assigned to the background and are eliminated. The remaining pixels are assigned to the foreground. In the torso segmentation process, process block 510, the plane of the torso is identified in foreground, with the remaining pixels going into the residual class. The head segmentation process, process block 520, identifies the head Gaussian blob, with the remaining pixels going into the new residual class. In the arms segmentation process, process block 530, the planes of the left and right arms are identified in a similar manner to the torso plane, with the remaining pixels going into the new residual class. Using the remaining pixels in the residual class, the left and right hand Gaussian blobs are identified in the hands segmentation process, process block 540.

Embodiments of the initialization segmentation processes are described in more depth as follows:

Background-Foreground Segmentation—The first process of the model initialization is the background segmentation. All of the pixels in the image that are farther away from the camera than a predetermined threshold, or for which there is not valid depth information, are assigned to the background. The remaining pixels are assigned to the upper body. If a stationary background is assumed, then the use of colors may improve the segmentation results. However, a stationary background is often a difficult condition to maintain, and making the wrong assumption on the background statistics can dramatically decrease the accuracy of the segmentation results. For this reason, in a particular embodiment the depth information alone is used for background-foreground segmentation.

Figure 6:
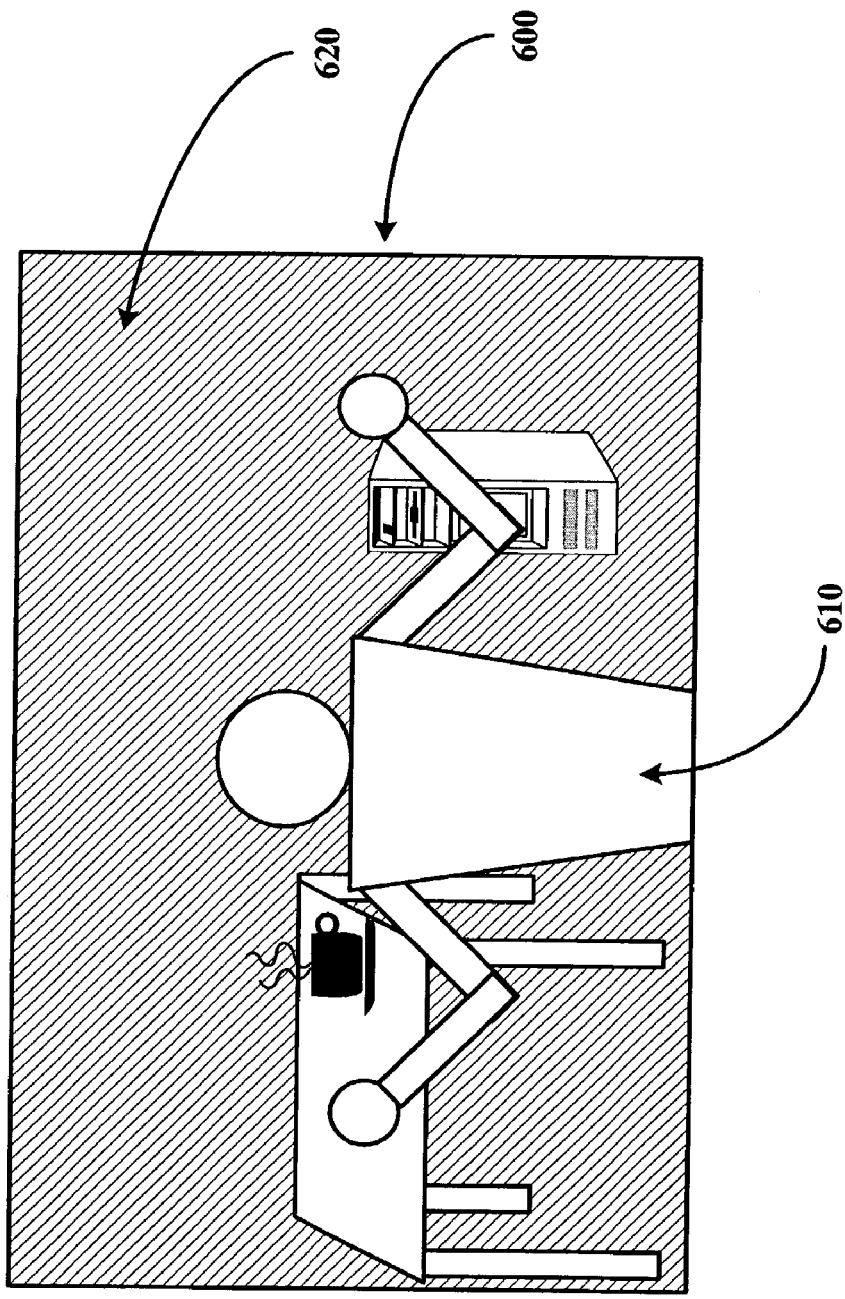
FIG. 6 illustrates an image of a subject and a background.
Figure 7:
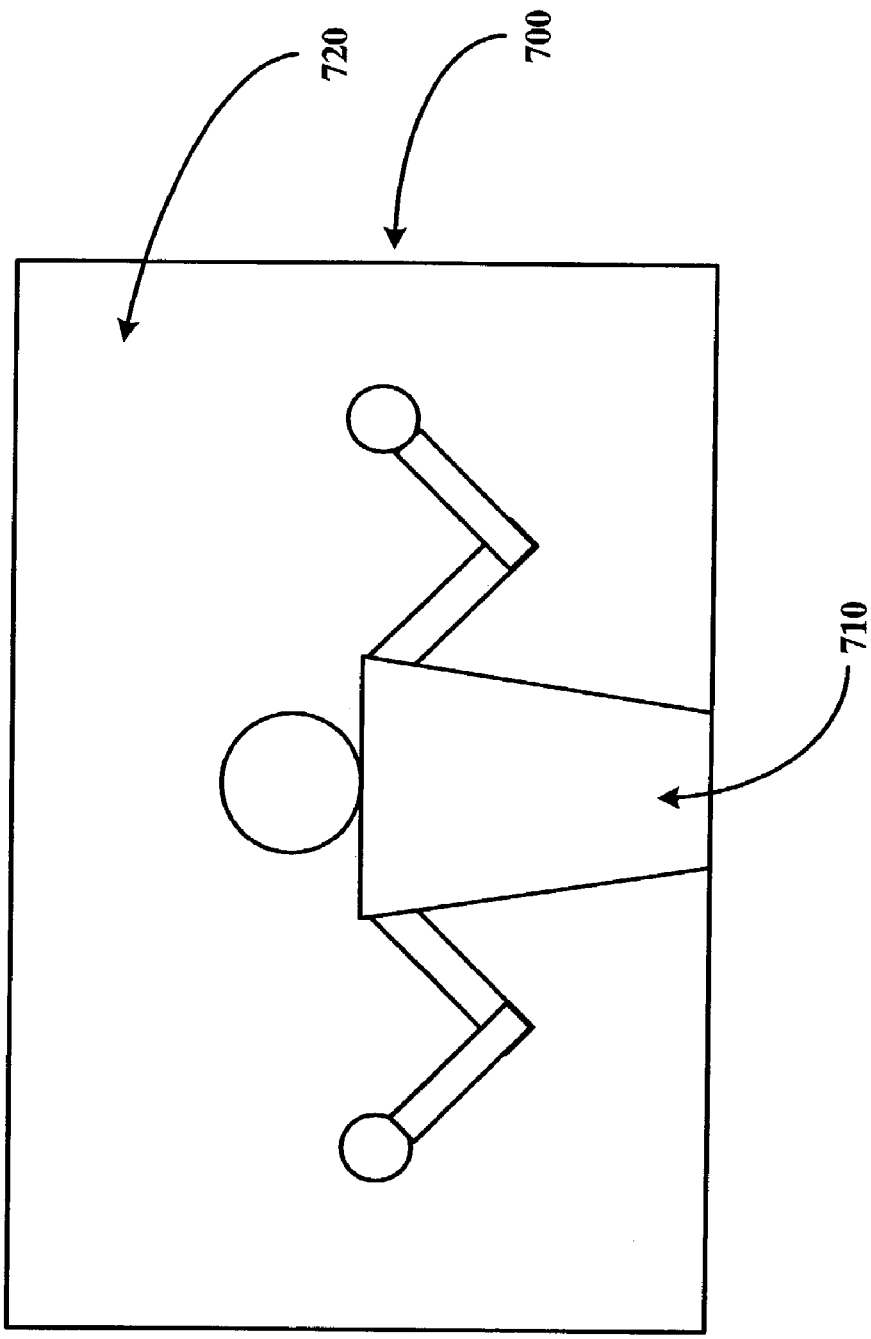
FIG. 7 illustrates an image of a subject with the background removed.

FIG. 6 is an illustration of an image of a subject that has been captured by the camera or other imaging device. Note that the images presented herein are necessarily limited to two dimensions, but images captured in an embodiment include depth information, thereby creating three-dimensional image data. The image 600 is comprised of a foreground 610, which is the subject, and a background 620. A result of foreground-background segmentation is shown in FIG. 7. If the segmentation has proceeded accurately, the image 700 now includes only the foreground 710 including the pixels showing the subject, while the pixels of the background 720 have been eliminated. For simplicity in illustration, FIGS. 7 through 11 show all pixels in the background eliminated, but in practice certain pixels in the background may be included in the foreground and certain pixels in the foreground may be included in the background. Similarly, pixels representing certain of the body segments of the subject may be allocated to other body segments.

Torso Segmentation—Any pixels assigned to the foreground are either generated by the torso plane or by the residual class of uniform distribution. Assuming that all observation vectors are independent random variables, the probability of observation vectors $O_{i,j}$ given the foreground image model $\Omega_F$ is given by:

$$P(\underline{O}_F) = \prod_{i,j \in F} \left\{ \sum_{all\ i,j \in F} P(O_{i,j}^d | \pi) P(O_{i,j}^c | \pi) + u_{i,j} \right\} \quad [7]$$

where $u_{i,j}$ is a uniform distribution that describes all of the residual class. The goal of the EM algorithm is to find the plane parameters such that $\pi$ will maximize $P(\underline{O})$. Since $O_{i,j}^c$ is a uniform distribution, it can be disregarded from the derivation of the EM algorithm. Let $\tilde{\pi}$ be the plane parameters after re-estimation. The new plane parameters are obtained after setting the derivatives of $E\{P(O)\log P(O)\}$ to zero with respect to the parameters of the planar state $\pi$. As a consequence, the re-estimated plane parameters are obtained by solving the following M-step (maximization) equations:

$$\tilde{a} = \frac{C_{yy}C_{xz} - C_{yz}C_{xy}}{C_{yy}C_{xx} - C_{xy}^2} \quad [8]$$

$$\tilde{b} = \frac{C_{yz} - \tilde{a}C_{xy}}{C_{yy}} \quad [9]$$

$$\tilde{c} = \mu_z - \tilde{a}\mu_x - \tilde{b}\mu_y \quad [10]$$

$$\tilde{\sigma}^2 = \frac{\sum_{all\ i,j}(z - ax - by - c)\gamma_{i,j}(\pi)}{\sum_{all\ i,j} \gamma_{i,j}(\pi)} \quad [11]$$

With the covariance matrix C being:

$$C = \begin{pmatrix} C_{xx} & C_{xy} & C_{xz} \\ C_{yx} & C_{yy} & C_{yz} \\ C_{zx} & C_{zy} & C_{zz} \end{pmatrix} \quad [12]$$

From this, the a posteriori probability $\gamma_{i,j}(\pi)$, the mean vector $\underline{\mu}=[\mu_x, \mu_y, \mu_z]$, and the covariance vector C are obtained in the E-step (estimation) equations:

$$\gamma_{i,j}(\pi) = \frac{P(O_{i,j}^d | \pi)}{P(O_{i,j}^d | \pi) + u_{i,j}} \quad [13]$$

$$\underline{\mu} = \sum_{all\ i,j} \frac{\gamma_{i,j}(\pi) O_{i,j}^d}{\sum_{all\ i,j} \gamma_{i,j}(\pi)} \quad [14]$$

$$C = \sum_{all\ i,j} \frac{\gamma_{i,j}(\pi)(O_{i,j}^d - \underline{\mu})(O_{i,j}^d - \underline{\mu})^T}{\sum_{all\ i,j} \gamma_{i,j}(\pi)} \quad [15]$$

The EM algorithm is repeated until convergence is reached, which is when $P(\underline{O}_F)$ at consecutive iteration falls below a convergence threshold. Given the re-estimated plane parameters, all pixels for which $P(\underline{O}_{i,j}|\pi)>u_{i,j}$ are assigned to the torso plane. One essential condition for the convergence of the EM algorithm to the correct set of parameters is that the torso represents the largest region of the upper body. Under a large variety of situations, excluding strong occlusions of the torso by the arms, it can be assumed that during the initialization stage that this condition is met.

Figure 8:
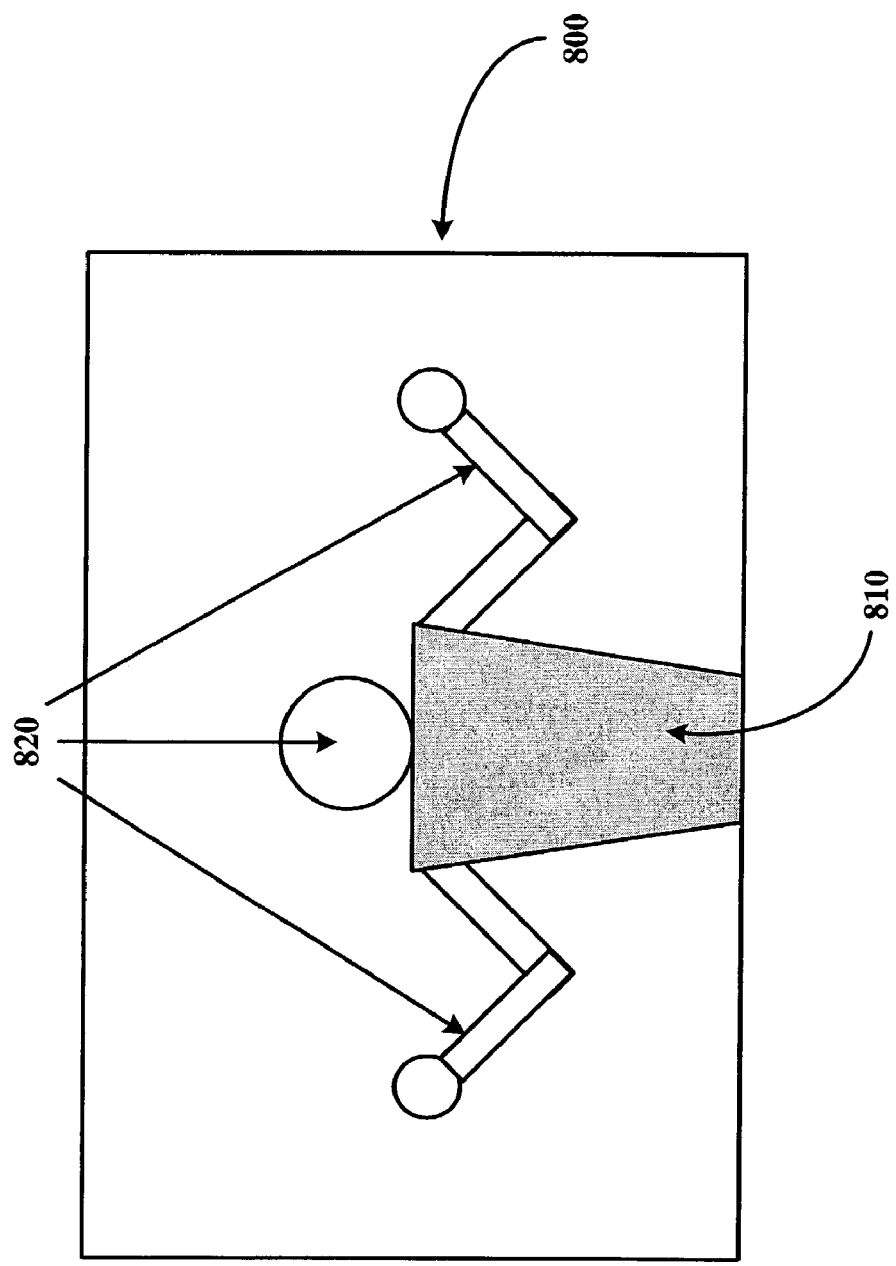
FIG. 8 illustrates the process of torso segmentation.

FIG. 8 illustrates the torso segmentation under an embodiment. The image 800 includes the plane of the torso 810 and the residual class of pixels 820. The residual class would include the remaining pixels showing the subject, those being the head, arms, and hands of the subject.

Head Segmentation—The initial position of the head is determined by searching the area above the torso. However, it is possible that the head was included within the torso plane and the area above the torso contains a small number of noisy points. In this case, the system looks for the head in the upper region of the torso. Exploiting the depth information further, the apparent size of the head in image plane can be obtained from the distance and orientation of the torso plane from the camera. The probability of the observation sequence $O_H$ in the initial head region H is given by:

$$P(O_H) = \prod_{all\ i,j \in H} \{P(O_{i,j} | \beta) + u_{i,j}\} \quad [16]$$

In equation [16], $u_{i,j}$ is a uniform density function corresponding to the residual class of the head region. The parameters of the head Gaussian blob are re-estimated using the EM algorithm for Gaussian density functions:

$$\underline{\tilde{\mu}} = \sum_{all\ i,j} \frac{\gamma_{i,j}(\beta) O_{i,j}}{\sum_{all\ i,j} \gamma_{i,j}(\beta)} \quad [17]$$

-continued $$\tilde{c} = \sum_{i,j} \frac{\gamma_{i,j}(\beta)(O_{i,j}-\underline{\mu})(O_{i,j}-\underline{\mu})^T}{\sum_{all\,i,j} \gamma_{i,j}(\beta)} \quad [18]$$

where:

$$\gamma_{i,j}(\beta) = \frac{P(O_{i,j}|\beta)}{P(O_{i,j}|\beta) + u_{i,j}} \quad [19]$$

Figure 9:
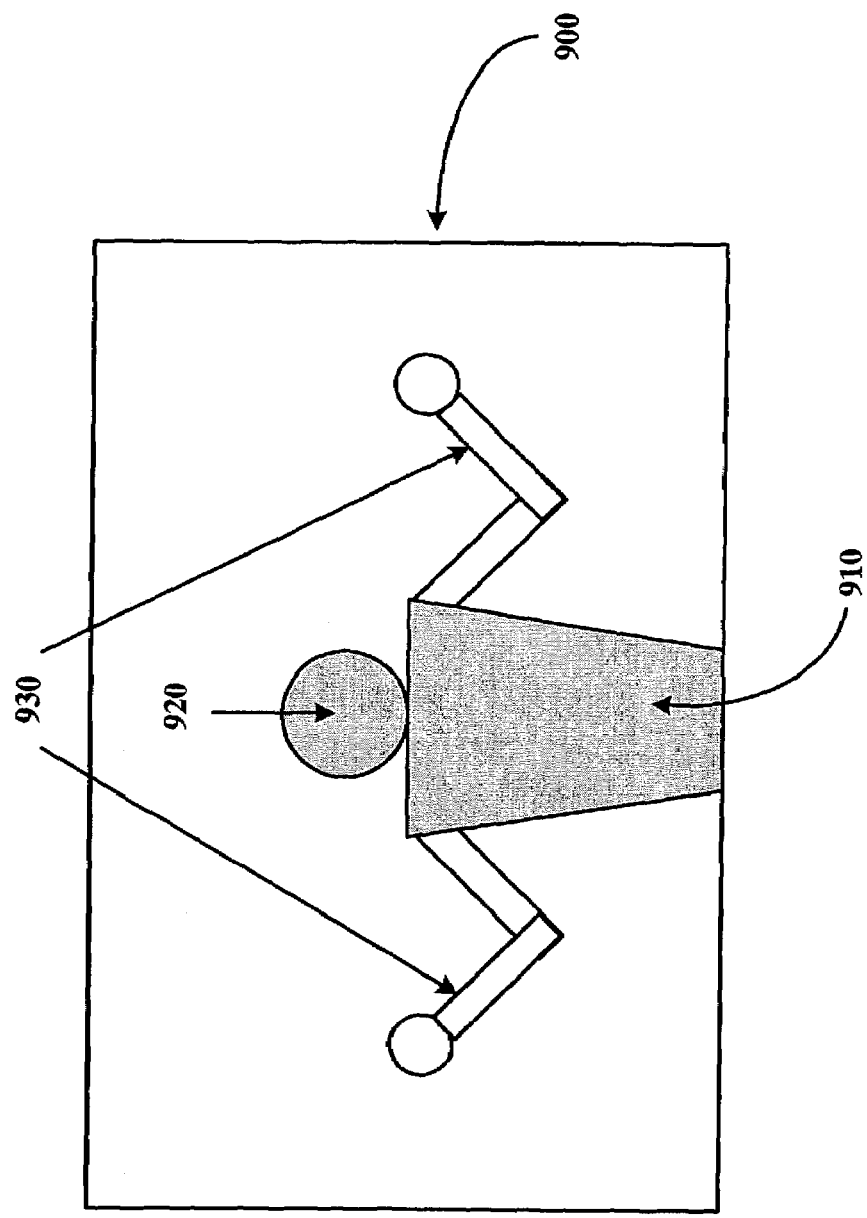
FIG. 9 illustrates the process of head segmentation.

The pixels for each $P(O_{i,j}|\beta) > u_{i,j}$ are assigned to the head region, and the remaining pixels are again assigned to the residual class. The process is illustrated in FIG. 9. The image 900 now includes the torso 910 of the subject, which has previously been identified, and the head 920 of the subject. The new residual class 930 includes the remaining pixels in the foreground, which would include the arms and hands of the subject.

Arms Segmentation—The arms are modeled by planar density functions. The planar density model does not restrict the natural degrees of freedom in the arm motion and provides a good description of the data available for the arms in stereo images. The parameters of the planes corresponding to the left and right arms are obtained using the same equations used for the torso plane. The regions of search for the left and right arms consist of the pixels on the left and right side of the torso center that were not previously assigned to the torso or the head.

Figure 10:
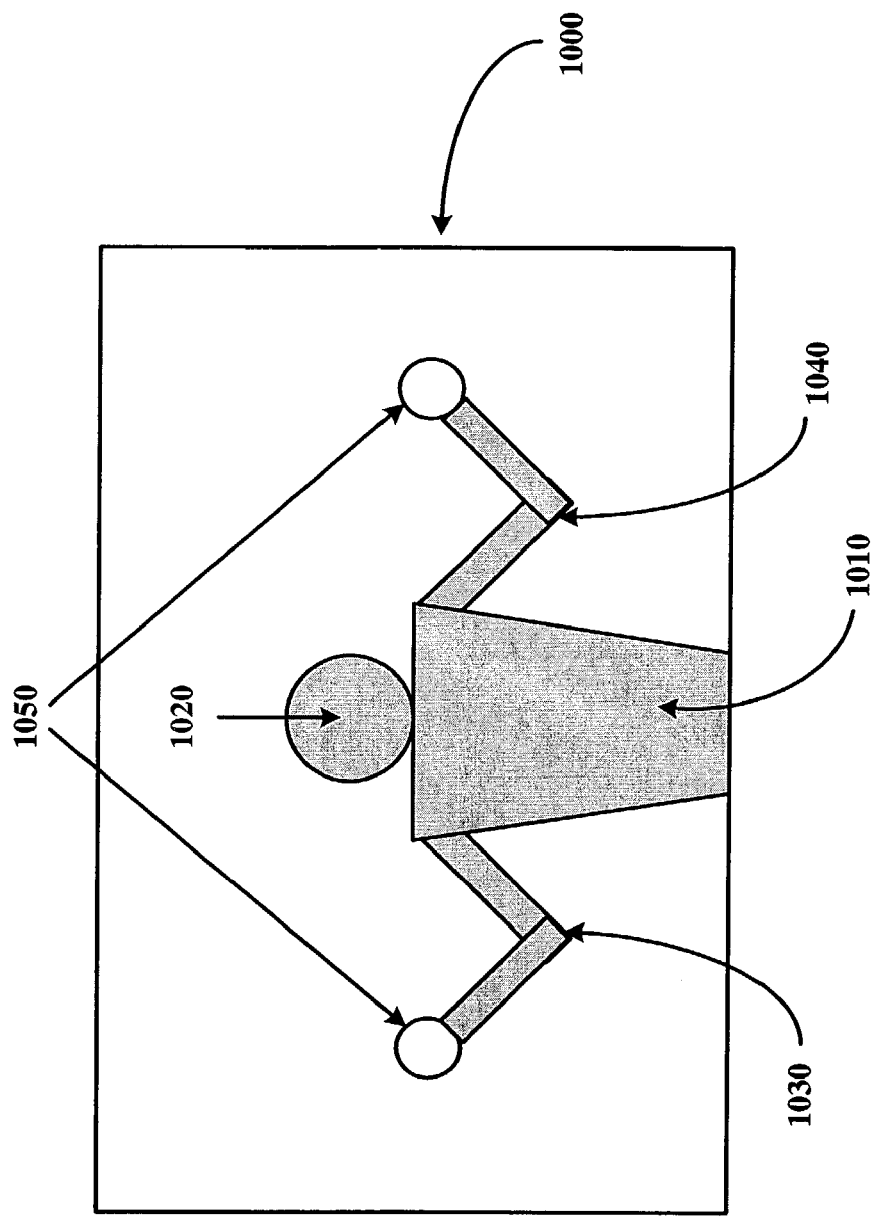
FIG. 10 illustrates the process of arms segmentation.

FIG. 10 illustrates the arm segmentation process. After identifying the left arm and the right arm of the subject, the image 1000 includes the torso 1010 and head 1020 of the subject, as previously identified, as well as the right arm 1030 and left arm 1040 of the subject. The residual class 1050 includes the remaining pixels in the foreground, which includes the left and right hands of the subject.

Hands Segmentation—The hands are modeled using Gaussian density functions. Similar to the modeling of the head of the subject, the observations for the hand models consist of the three-dimensional position and the hue value of the pixels. Several conventional approaches to gesture recognition use the a priori information about the skin color to detect the hands and or the face in an image. However, these approaches often fail in environments characterized by strong variations in illumination. Instead, an embodiment initializes the position of the hands by finding the regions of the arm planes that have the color similar to the hue value obtained from the head segmentation. The parameters of the hand Gaussian blobs are then determined using the same EM algorithm for the Gaussian density functions used to estimate the parameters of the head blob.

FIG. 11 illustrates the hands segmentation. After the segmentation process, image 1100 includes torso 1110, head 1120, right arm 1130, and left arm 1140 of the subject, as previously identified, as well as the right hand 1150 and left hand 1160 of the subject. For simplicity, FIGS. 10 and 11 indicate that the residual class prior to hands segmentation includes only the hands of the subject, but in practice other pixels that should have been previously assigned to the background or to other body segments of the subject may also be included.

Tracking the Upper Body Model—The initial parameters obtained individually for the torso, head, arms, and hands are refined by estimating them simultaneously. The optimal set of parameters for the upper body model are obtained through the EM algorithm by setting the derivatives of $E\{P(Q|\Omega)\log P(Q|\Omega)\}$ with respect to the model parameters $\Omega$ to zero. The a priori probabilities $P_{O,\pi_m}(O_{i,j})$ and $P_{O,\beta_n}(O_{i,j})$ of the observation vectors are calculated for the estimated model parameters from the previous frame. These parameters are estimated through a Kalman predictor. In the M process of the EM algorithm, the a posteriori probabilities of the model parameters given the observed data are computed to be as follows:

$$\gamma_{i,j}(\beta_k) = \quad [20]$$

$$\frac{P_{O,\beta_k}(O_{i,j})P(O_{i,j}|\beta_k)}{\sum_{m=1}^{3} P_{O,\beta_m}(O_{i,j})P(O_{i,j}|\beta_m) + \sum_{n=1}^{3} P_{O,\pi_n}(O_{i,j})P(O_{i,j}|\pi_m) + u_{i,j}}$$

$$\gamma_{i,j}(\pi_k) = \quad [21]$$

$$\frac{P_{O,\pi_k}(O_{i,j})P(O_{i,j}|\pi_k)}{\sum_{m=1}^{3} P_{O,\beta_m}(O_{i,j})P(O_{i,j}|\beta_m) + \sum_{n=1}^{3} P_{O,\pi_n}(O_{i,j})P(O_{i,j}|\pi_m) + u_{i,j}}$$

In the E (estimation) process, the new set of the plane parameters are re-estimated according to the equations [8] through [11] and the Gaussian blob parameters are re-estimated using equations [17] and [18]. The pixels for which $$P(O_{i,j}|\pi_k) > \max\left[\max_{all\,m \neq k} P(O_{i,j}|\pi_m), \max_{all\,n} P(O_{i,j}|\beta_n), u_{i,j}\right] \quad [22]$$

are assigned to plane $\pi_k$. Similarly, the pixels for which $$P(O_{i,j}|\beta_k) > \max\left[\max_{all\,m \neq k} P(O_{i,j}|\beta_m), \max_{all\,n} P(O_{i,j}|\pi_n), u_{i,j}\right] \quad [23]$$

are assigned to Gaussian blob $\beta_k$.

Gesture Recognition—Hidden Markov models (HMM) are a popular tool for the classification of dynamic gestures because of the flexibility of such models in the modeling of signals while preserving the essential structure of the hand gestures. In an embodiment herein, an HMM-base recognition system for gesture recognition that uses as observation vectors the trajectory of the hands of the subject in three-dimensional space. Although the hand trajectories in the image plane are conventional features for gesture recognition, the trajectories in a two-dimensional image plane cannot unambiguously describe the motion of the hands in a plane perpendicular to the image plane. The use of disparity maps enables the trajectory of the hands in three-dimensional space to be obtained, and these trajectories are used as observation vectors in an embodiment. Further, the use of disparity maps in combination with color information result in the robust segmentation of the upper body that is largely independent of illumination conditions or changes in the background scene.

The use of dense disparity maps for gesture recognition is helpful because stereo is considerably more robust than color alone to variations in illumination conditions, and because depth disparity maps reduce the inherent depth ambiguity present in two-dimensional images and therefore enables more accurate segmentation of images under partial occlusions and self-occlusions.

The use of depth disparity maps adds some complications to the gesture recognition process. Stereo algorithms are often difficult and laborious to develop and are computationally expensive. Correspondence-based stereo algorithms may produce noisy disparity maps. However, consumer stereo cameras have become more available and the performance of personal computers has increased such that stereo computation can be done at reasonable frame rates. An example of a camera that is used in an embodiment is the Digiclops Stereo Vision System of Point Grey Research, Inc. of Vancouver, British Columbia. Since the performance of a dynamic gesture recognition system greatly depends on the quality of the observation vector sequences, the use of stereo images in a system requires extra care. The use of depth maps instead of color information to describe the upper body model is one very important element in building a system that is provides robust performance in varying illumination conditions, shadow effects, non-stationary background scenes, and occlusions and self-occlusions of the upper body.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
capturing a sequence of stereo images, the stereo images including at least a portion of a subject performing a dynamic gesture;
obtaining depth disparities relating to the stereo images;
automatically initializing parameters of a statistical model of the subject based upon matching an image of the subject to the statistical model;
tracking the subject using the statistical model of the subject;
extracting three-dimensional features from the stereo images; and
interpreting the dynamic gesture performed by the subject.

2. The method of claim 1, further comprising segmenting an image of the subject into subparts.

3. The method of claim 2, wherein the subparts represent at least the torso, head, arms, and hands of the subject.

4. The method of claim 1, wherein the statistical model of the subject models the arms and torso of the subject as planes.

5. The method of claim 1, wherein the statistical model of the subject models the head and hands of the subject as Gaussian components.

6. The method of claim 1, further comprising removing the background from the stereo images.

7. The method of claim 6, wherein removing the background from the stereo images comprises eliminating any portion of the stereo images that is more than a given distance away from a location.

8. The method of claim 1, wherein the stereo images are captured using a stereo camera.

9. The method of claim 1, wherein obtaining depth disparities comprises generating a depth disparity map.

10. The method of claim 1, wherein interpreting the dynamic gesture comprises comparing the dynamic gesture to a three-dimensional model of a gesture.

11. The method of claim 10, wherein comparing the dynamic gesture to a three-dimensional model of a gesture includes the use of hidden Markov models of three-dimensional gestures.

12. A gesture recognition system comprising:
an imaging device to capture a sequence of three-dimensional images of a least a portion of a subject and a background, the subject performing a dynamic gesture;
a processor to perform operations comprising:
processing a set of depth disparities relating to the stereo images;
automatically initializing parameters of a statistical model of the subject based upon matching an image of the subject to the statistical model;
tracking the subject using the statistical model of the subject;
extracting three-dimensional features from the subject; and
interpreting the dynamic gesture performed by the subject.

13. The gesture recognition system of claim 12, wherein the imaging device is a stereo video camera.

14. The gesture recognition system of claim 12, wherein the processor further performs operations comprising removing the background from the sequence of stereo images.

15. The gesture recognition system of claim 14, wherein removing the background from the sequence of stereo images comprises eliminating any portion of the images that is farther away from the imaging device than a given distance.

16. The gesture recognition system of claim 12, wherein the processor further performs operations comprising segmenting an image of the subject into subparts.

17. The gesture recognition system of claim 16, wherein the subparts represent at least the torso, head, arms, and hands of the subject.

18. The gesture recognition system of claim 12, wherein the statistical model of the subject models the arms and torso of the subject as planes.

19. The gesture recognition system of claim 12, wherein the statistical model of the subject models the head and hands of the subject as Gaussian components.

20. The gesture recognition system of claim 12, wherein interpreting the dynamic gesture performed by the subject comprises comparing the dynamic gesture to a three-dimensional model of a gesture.

21. The gesture recognition system of claim 20, wherein comparing the dynamic gesture to a three-dimensional model of a gesture includes the use of hidden Markov models of three-dimensional gestures.

22. A machine-readable medium having stored thereon data representing sequences of instruction that, when executed by a machine, cause the machine to perform operations comprising:
capturing a sequence of stereo images, the stereo images including at least a portion of a subject performing a dynamic gesture;
obtaining depth disparities relating to the stereo images;
automatically initializing parameters of a statistical model of the subject based upon matching an image of the subject to the statistical model;
tracking the subject using the statistical model of the subject;
extracting three-dimensional features from the stereo images; and interpreting the dynamic gesture performed by the subject.

23. The medium of claim 22, further comprising sequences of instruction that, when executed by a machine, cause the machine to perform operations comprising segmenting an image of the subject into subparts.

24. The medium of claim 23, wherein the subparts represent at least the torso, head, arms, and hands of the subject.

25. The medium of claim 22, wherein the statistical model of the subject models the arms and torso of the subject as planes.

26. The medium of claim 22, wherein the statistical model of the subject models the head and hands of the subject as Gaussian components.

27. The medium of claim 22, further comprising sequences of instruction that, when executed by a machine, cause the machine to perform operations comprising removing the background from the stereo images.

28. The medium of claim 27, wherein removing the background from the stereo images comprises eliminating any portion of the stereo images that is more than a given distance away from a location.

29. The medium of claim 22, wherein the stereo images are captured using a stereo camera.

30. The medium of claim 22, wherein obtaining depth disparities comprises generating a depth disparity map.

31. The medium of claim 22, wherein interpreting the dynamic gesture comprises comparing the dynamic gesture to a three-dimensional model of a gesture.

32. The medium of claim 31, wherein comparing the dynamic gesture to a three-dimensional model of a gesture includes the use of hidden Markov models of three-dimensional gestures.

* * * * *